US009791084B2

(12) United States Patent
Fujii et al.

(10) Patent No.: US 9,791,084 B2
(45) Date of Patent: Oct. 17, 2017

(54) PIPE JOINT MADE OF SYNTHETIC RESIN

(71) Applicant: Nippon Pillar Packing Co., Ltd., Osaka-shi, Osaka (JP)

(72) Inventors: Makoto Fujii, Osaka (JP); Toshihide Iida, Osaka (JP)

(73) Assignee: Nippon Pillar Packing Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 14/889,695

(22) PCT Filed: Apr. 23, 2014

(86) PCT No.: PCT/JP2014/061429
§ 371 (c)(1),
(2) Date: Nov. 6, 2015

(87) PCT Pub. No.: WO2014/181686
PCT Pub. Date: Nov. 13, 2014

(65) Prior Publication Data
US 2016/0116096 A1    Apr. 28, 2016

(30) Foreign Application Priority Data
May 8, 2013 (JP) ................................. 2013-098696

(51) Int. Cl.
*F16L 55/00* (2006.01)
*F16L 47/04* (2006.01)
(Continued)

(52) U.S. Cl.
CPC ............. *F16L 47/04* (2013.01); *F16L 19/028* (2013.01); *F16L 33/223* (2013.01)

(58) Field of Classification Search
USPC ..................... 285/247, 331, 93, 92
See application file for complete search history.

(56) References Cited

U.S. PATENT DOCUMENTS

| 5,240,289 A | 8/1993 | Gottling et al. |
| 5,388,871 A | 2/1995 | Saitoh |

(Continued)

FOREIGN PATENT DOCUMENTS

| CN | 1502841 A | 6/2004 |
| CN | 1299039 C | 2/2007 |

(Continued)

OTHER PUBLICATIONS

International Search Report issued in PCT/JP2014/061429 dated Jul. 22, 2014 (2 pages).

(Continued)

*Primary Examiner* — Aaron Dunwoody
(74) *Attorney, Agent, or Firm* — Osha Liang LLP

(57) ABSTRACT

A pipe joint made of synthetic resin includes: a joint body including a male screw portion on an outer circumferential portion; and a union nut including a female screw portion formed on an inner circumferential portion such that the female screw portion is tightened onto the male screw portion of the joint body. An outer circumferential surface of the joint body has a projection portion that is integrated therewith and projects radially outward. An inner circumferential surface of the union nut has a convex or concave engagement portion that is integrated therewith and engages with the projection portion when the union nut is tightened up to an appropriate position.

3 Claims, 5 Drawing Sheets

(51) Int. Cl.
*F16L 19/028* (2006.01)
*F16L 33/22* (2006.01)

(56) References Cited

U.S. PATENT DOCUMENTS

| | | | | |
|---|---|---|---|---|
| 5,452,748 | A | * 9/1995 | Simmons | B65D 41/04 138/89 |
| 5,743,572 | A | 4/1998 | Nishio | |
| 5,746,454 | A | * 5/1998 | Webb | F16L 39/005 285/123.12 |
| 5,906,398 | A | * 5/1999 | Larsen | F16L 47/16 285/24 |
| 6,056,326 | A | * 5/2000 | Guest | F16L 21/04 285/314 |
| 6,142,535 | A | 11/2000 | Nishio et al. | |
| 6,334,632 | B1 | 1/2002 | Nishio et al. | |
| 7,563,993 | B2 | * 7/2009 | Drotleff | H02G 15/007 174/653 |
| 2003/0155768 | A1 | * 8/2003 | Hollingsworth | F16L 47/16 285/333 |
| 2004/0100097 | A1 | 5/2004 | Fukano et al. | |
| 2004/0227345 | A1 | * 11/2004 | Okamoto | F16L 47/04 285/331 |
| 2005/0073148 | A1 | 4/2005 | Inoue | |
| 2006/0157975 | A1 | * 7/2006 | Fujii | F16L 19/028 285/247 |
| 2009/0066081 | A1 | * 3/2009 | Katsura | F16L 41/10 285/331 |
| 2011/0210544 | A1 | 9/2011 | Teshima et al. | |
| 2011/0221190 | A1 | 9/2011 | Teshima et al. | |
| 2011/0260450 | A1 | 10/2011 | Imanishi et al. | |
| 2016/0215912 | A1 | 7/2016 | Fujii et al. | |

FOREIGN PATENT DOCUMENTS

| | | |
|---|---|---|
| CN | 101382219 A | 3/2009 |
| CN | 102112792 A | 6/2011 |
| CN | 102112793 A | 6/2011 |
| CN | 102232158 A | 11/2011 |
| EP | 1233225 A1 | 8/2002 |
| EP | 1398559 A1 | 3/2004 |
| JP | H05-126288 A | 5/1993 |
| JP | H06-40576 U | 5/1994 |
| JP | H06-201081 A | 7/1994 |
| JP | H10-054489 A | 2/1998 |
| JP | H11-94178 A | 4/1999 |
| JP | H11-230463 A | 8/1999 |
| JP | H11-280965 A | 10/1999 |
| JP | 2003-166727 A | 6/2003 |
| JP | 2009-085286 A | 4/2009 |
| JP | 2010-127427 A | 6/2010 |
| JP | 2010-223291 A | 10/2010 |
| JP | 2010-223347 A | 10/2010 |
| JP | 2010-261499 A | 11/2010 |
| JP | 2010-261520 A | 11/2010 |

OTHER PUBLICATIONS

Office Action in corresponding Chinese Patent Application No. 201480050205.9 dated Dec. 5, 2016 (9 pages).
Extended European Search Report issued in corresponding European Patent Application 14795010.9 dated Dec. 16, 2016 (7 pages).
English translation of International Search Report and Written Opinon issued in corresponding International Application No. PCT/JP2014/075607 dated Dec. 22, 2014 (7 pages).
Office Action issued in corresponding Chinese Application No. 201480025252.8 dated Oct. 27, 2016, and English translation thereof (11 pages).

* cited by examiner

PIPE JOINT MADE OF SYNTHETIC RESIN

TECHNICAL FIELD

One or more embodiments of the present invention relate to a pipe joint which is made of synthetic resin and used as connecting means for a tube, made of synthetic resin, which serves as a fluid device or a fluid path such as a pump, a valve, and a filter.

BACKGROUND ART

To date, for piping paths required to have chemical resistance or the like, tubes or pipe joints made of synthetic resin such as fluororesin have been used. As such, the pipe joint includes: a joint body to be mounted to a leading end portion of a tube; and a union nut having a female screw portion to be tightened onto a male screw portion formed on the outer circumferential portion of the joint body, is often used. The pipe joint has a structure in which the union nut is tightened onto the outer circumferential portion of the joint body, to assuredly obtain a sealing performance between the joint body and the tube.

For example, in a joint made of resin as described in Patent Literature 1, an inner ring (fitting portion) 13 is pressed into a leading end portion of a tube (tubing) 12, made of synthetic resin, in a pipe joint made of synthetic resin such that a fluid path is formed by an inner circumferential portion of the inner ring 13, and the inner ring 13 has a protrusion 15 that protrudes radially outward, as shown in FIG. 1 of Patent Literature 1. The tube 12, which has been deformed so as to have its diameter enlarged by the protrusion 15 of the inner ring 13 being pressed into the tube 12, is inserted into a receiver opening 4 of a joint body 1. The pipe joint made of synthetic resin includes the joint body 1 made of synthetic resin and a union nut (pressing ring) 3 made of synthetic resin. The joint body 1 is mounted on the outer circumferential side of the tube 12. The union nut 3 is mounted on the outer circumferential side of the joint body 1, and has a female screw portion 19 that is formed thereinside so as to be screwed onto a male screw portion 11 formed on the outer circumferential portion of the joint body 1. The pipe joint made of synthetic resin allows the union nut 3 to be screwed forward onto the joint body 1, and the union nut 3 to press, in the axis direction, the tube 12 into which the inner ring 13 is pressed, thereby providing connection to the tube 12.

In the above structure, in order to assuredly obtain a favorable sealing performance, a degree of tightening of the union nut onto the joint body needs to be controlled so as to represent an appropriate value. As a method for controlling a degree of tightening, for example, a method for tightening the union nut while measuring a tightening torque with the use of a torque wrench, a method for tightening the union nut by turning the union nut a predetermined number of times while measuring the number of turnings for tightening, a method for gradually tightening the union nut while repeatedly measuring a tightening extent with the use of a feeler gauge or the like, or a method in which a ring-shaped tightening regulation member is additionally provided for regulating a tightening movement when the union nut has been tightened to an appropriate degree (see, for example, Patent Literature 2), are known.

CITATION LIST

Patent Literature

PATENT LITERATURE 1: Japanese Laid-Open Patent Publication No. H10-54489

PATENT LITERATURE 2: Japanese Laid-Open Patent Publication No. H11-94178

SUMMARY OF INVENTION

Furthermore, in recent years, reduction in size of a semiconductor manufacturing apparatus has been developed, and a degree of integration of components mounted in the apparatus is increased. Therefore, an operator is forced to blindly perform maintenance work such as replacement of components in a narrow space under present circumstances. A conventional pipe joint made of synthetic resin includes a joint body, a sleeve, and a union nut, which are used in combination. From the viewpoint that an emphasis is to be placed on a sealing property, single thread screws are used as screws formed on the outer circumferential portion of the joint body and the inner circumferential portion of the union nut. The union nut and the joint body having the single thread screws allow the sealing performance exhibited by a joint to be stabilized. However, an operator is forced to be in such a difficult situation that the operator has to turn the union nut many times in a narrow work space.

Further, the methods for controlling the degree of tightening have the following characteristics, respectively. That is, in the method for controlling a tightening torque, a torque error occurs for each tool in use, so that a degree of tightening is likely to vary. Further, in the method for controlling the number of turnings for tightening, a reference position for turning of the union nut in measuring the number of turnings for tightening, is determined by manually performing tightening or the like, so that a degree of tightening is likely to vary. Further, in the method for controlling a gap dimension, a lead over which the union nut moves, in the axial direction, relative to a turning angle of the union nut, is very small, and a point of time at which the tightening is to be finished varies depending on each operator, so that a degree of tightening is likely to vary. Further, in the control method for regulating a tightening movement, a tightening regulation member needs to be separately provided, so that the number of components is increased, and the maintenance work becomes more difficult. Under such circumstances and the like, the above-described control means for a degree of tightening make maintenance work for semiconductor manufacturing apparatuses or the like more difficult.

One or more embodiments of the present invention provide a pipe joint, made of synthetic resin, which allows a degree of tightening of a union nut to be appropriately controlled without increasing the number of components.

A pipe joint made of synthetic resin according to one or more embodiments of the present invention include: a joint body made of synthetic resin, the joint body having a male screw portion on an outer circumferential portion, the joint body being mounted to a leading end portion of a tube made of synthetic resin; and a union nut made of synthetic resin, the union nut having a female screw portion formed on an inner circumferential portion such that the female screw portion is tightened onto the male screw portion of the joint body. In the pipe joint made of synthetic resin, one surface of an outer circumferential surface of the joint body and an inner circumferential surface of the union nut has a projection portion integrated with the one surface such that the projection portion projects in a radial direction, and the other surface of the outer circumferential surface of the joint body and the inner circumferential surface of the union nut has a convex or concave engagement portion integrated with the other surface such that the engagement portion engages with the projection portion when the union nut is tightened up to an appropriate position.

According to one or more embodiments of the present invention, when the union nut has been tightened up to an appropriate position, the engagement portion engages with the projection portion. Therefore, an operator is allowed to easily confirm, according to the engagement, that a degree of tightening of the union nut has reached an appropriate value. Thus, tightening of the union nut can be appropriately controlled. Further, the projection portion is integrated with the outer circumferential surface of the joint body, and the engagement portion is integrated with the inner circumferential surface of the union nut. Therefore, tightening of the union nut can be appropriately controlled without increasing the number of components.

Further, in the pipe joint made of synthetic resin, the male screw portion and the female screw portion have multiple thread screws. In this case, when the female screw portion of the union nut is tightened onto the male screw portion of the joint body, a distance (lead) over which the union nut advances in the axial direction with a single turning of the female screw portion, is increased. Thus, a time for tightening the union nut can be shortened. Therefore, piping construction and maintenance work for the tube made of synthetic resin can be accurately performed in a short time period.

Further, in the pipe joint made of synthetic resin, a contact surface with which an end surface of the union nut contacts simultaneously with engagement of the engagement portion with the projection portion, is formed on the outer circumferential portion of the joint body. In this case, when the union nut has been tightened up to an appropriate position, engagement of the engagement portion with the projection portion, and contact of the end surface of the union nut with the contact surface of the joint body are simultaneously performed. Therefore, an operator is allowed to more easily confirm, according to the engagement and contact, that a degree of tightening of the union nut has reached an appropriate value. Further, contact of the end surface of the union nut with the contact surface of the joint body can prevent the union nut from being tightened further from the appropriate state. Therefore, when a degree of tightening of the union nut has reached an appropriate value, the tightening can be assuredly finished.

Further, the engagement portion is moved over the projection portion to engage with the projection portion. In this case, a torque required for tightening varies so as to be different between before the engagement portion is moved over the projection portion and after the engagement portion has been moved over the projection portion. Therefore, it can be more easily confirmed, according to the torque having varied, that a degree of tightening of the union nut has reached an appropriate value. Moreover, the engagement portion is moved over the projection portion, thereby preventing the union nut from being loosened.

Advantageous Effects of Invention

A pipe joint made of synthetic resin according to one or more embodiments of the present invention allow tightening of a union nut to be appropriately controlled without increasing the number of components.

DESCRIPTION OF EMBODIMENTS

Hereinafter, embodiments of a pipe joint made of synthetic resin according to one or more embodiments of the present invention will be described with reference to the drawings.

Figure 1A:
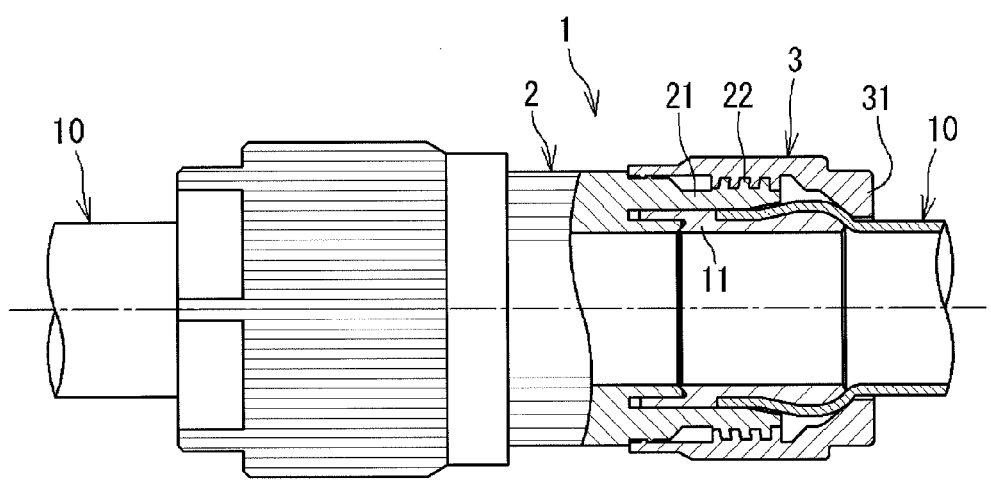
FIG. 1A is a cross-sectional view of a pipe joint made of synthetic resin according to one or more embodiments of a first example of the present invention.
Figure 1B:
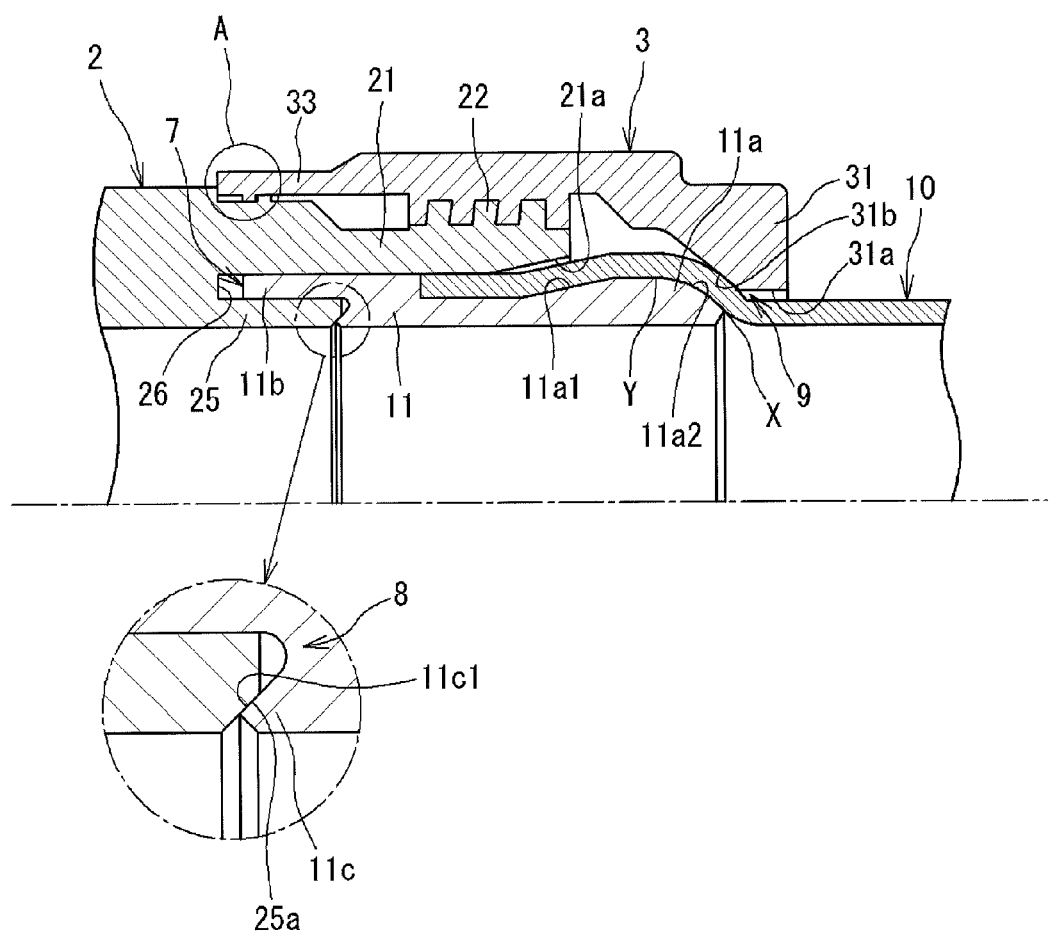
FIG. 1B is an enlarged cross-sectional view of a main portion of the pipe joint made of synthetic resin.

FIG. 1A is a cross-sectional view of a pipe joint made of synthetic resin according to one or more embodiments of a first example of the present invention. Further, FIG. 1B is an enlarged cross-sectional view of a main portion of the pipe joint made of synthetic resin. In FIG. 1A, a pipe joint 1 made of synthetic resin includes a joint body 2, a union nut 3, and an inner ring 11. The joint body 2 is made of synthetic resin and mounted on the outer circumferential side of a leading end portion of a tube 10 made of synthetic resin (PFA or the like). The union nut 3 is made of synthetic resin and mounted on the outer circumferential side of the joint body 2. The inner ring 11 is made of synthetic resin and mounted on the inner circumferential side of the leading end portion of the tube 10.

In the description herein, directions from the center, in the axial direction, of the joint body 2 toward both sides, in the axial direction, of the joint body 2 are each referred to as an axially outward direction (axially outer side), and directions from both the sides, in the axial direction, of the joint body 2 toward the center, in the axial direction, of the joint body 2 are each referred to as an axially inward direction (axially inner side).

In FIG. 1B, the inner ring 11 is formed so as to be cylindrical, and the inner diameter thereof is set so as to be almost equal, in dimension, to the inner diameter of the tube 10 so as not to prevent movement of fluid. A protrusion 11a is formed on the outer circumferential portion of an end portion, on the axially outer side, of the inner ring 11, and protrudes radially outward. The protrusion 11a is pressed into the leading end portion of the tube 10, to enlarge the diameter of the leading end portion. The outer circumferential surface of the protrusion 11a is a convex curved surface. A tilt surface 11a1 is formed axially inward of a maximum outer diameter point Y at which the protrusion 11a has the maximum outer diameter such that the tilt surface 11a1 has its diameter gradually reduced in the axially inward direction.

The convex curved surface of the protrusion 11a has an arc-shaped surface 11a2 between the maximum outer diameter point Y and an axially outer end point X that is an axially outer end of the protrusion 11a. The arc-shaped surface 11a2 thus formed, has the following action and effects.

In a case where, for example, the convex curved surface of the protrusion 11a is formed as a tilt surface that has its diameter gradually enlarged from the axially outer end point X toward the maximum outer diameter point Y, the inner circumferential surface of the tube 10 made of synthetic resin contacts, due to its high rigidity, with the axially outer end point X and the maximum outer diameter point Y of the protrusion 11a. However, the inner circumferential surface of the tube 10 may not contact with a portion between these contact portions in some cases. In such a case, when the inner ring 11 is pressed into the tube 10, the contact at the above two points may be interrupted in the case of the inner ring 11 being slightly tilted. On the other hand, in a case where the arc-shaped surface 11a2 is formed on the outer circumferential surface of the protrusion 11a as in the present example, the inner circumferential surface of the tube 10 can be brought into close surface contact with the protrusion 11a between the axially outer end point X and the maximum outer diameter point Y of the protrusion 11a without forming a gap. Thus, even when the inner ring 11 is slightly tilted in an operation of press-in of the inner ring 11, interruption of the contact portions between the outer circumferential surface of the protrusion 11a and the inner circumferential surface of the tube 10 may be prevented. Therefore, a sealing performance between the outer circumferential surface of the protrusion 11a and the inner circumferential surface of the tube 10 can be enhanced, whereby fluid can be prevented from entering therebetween.

A projection 11b having a cylindrical shape is formed in the end portion, on the axially inner side, of the inner ring 11 so as to project from the leading end portion of the tube 10 in the axially inward direction. The outer diameter of the projection 11b is set so as to be almost equal, in dimension, to the outer diameter of the leading end of the tube 10. Further, an annular raised portion 11c is formed radially inward of the projection 11b, in the end portion, on the axially inner side, of the inner ring 11 so as to be raised in the axially inward direction. The outer circumferential surface of the raised portion 11c forms a tapered surface 11c1 having its diameter gradually enlarged from the end on the axially inner side toward the axially outer side.

The joint body 2 is made of a synthetic resin material such as PVC, PP, PE, or fluororesin (such as PFA or PTFE), and formed so as to have a cylindrical shape. The inner diameter of the joint body 2 is set so as to be almost equal, in dimension, to the inner diameter of the inner ring 11. The joint body 2 has a receiver opening 21 formed in the axially outer end portion of the joint body 2. Through the receiver opening 21, the leading end portion of the tube 10 into which the inner ring 11 is pressed is inserted into the joint body 2. A male screw portion 22 having a triple thread screw (multiple thread screw) is formed on the outer circumferential portion of the receiver opening 21 (also see FIG. 2).

In the joint body 2, a cylindrical sealing portion 25 having a cylindrical shape is formed radially inward of the axially inner end portion of the receiver opening 21. An annular groove 26 is formed between the outer circumferential surface of the cylindrical sealing portion 25 and the opposing inner circumferential surface of the receiver opening 21, and the projection 11b of the inner ring 11 is inserted into the annular groove 26. At least one circumferential surface of the inner circumferential surface and the outer circumferential surface of the projection 11b fits to or contacts with at least one, of the inner circumferential surface and the outer circumferential surface of the annular groove 26, opposing the at least one circumferential surface, whereby an inner-side diameter outer sealing portion 7 for fluid sealing is formed.

A tapered surface 25a is formed on the inner circumferential surface of the axially outer end portion of the cylindrical sealing portion 25. The tapered surface 25a has its diameter gradually enlarged from the axially inner side toward the axially outer end. The tapered surface 25a is brought into surface contact with the tapered surface 11c1 of the raised portion 11c of the inner ring 11, whereby an inner-side diameter inner sealing portion 8 for fluid sealing is formed.

A tilt surface 21a is formed on the inner circumferential surface of the axially outer end portion of the receiver opening 21. The tilt surface 21a has its diameter gradually reduced from the axially outer end in the axially inward direction. The tilt surface 21a is almost parallel to the tilt surface 11a1 of the protrusion 11a of the inner ring 11, and is formed so as to be maintained spaced from the outer circumferential surface of the tube 10 that closely contacts with the tilt surface 11a1.

Thus, since the receiver opening 21 has the tilt surface 21a formed therein, when the inner ring 11 that has been pressed into the tube 10 is moved in the axially inward direction from the receiver opening 21 of the joint body 2, the outer circumferential surface of the tube 10 that closely contacts with and covers the tilt surface 11a1 of the inner ring 11 can be prevented from contacting with the tilt surface 21a of the joint body 2. Therefore, the receiver opening 21 of the joint body 2 does not prevent movement of the inner ring 11 in the axially inward direction, whereby the annular groove 26 and the projection 11b in the inner-side diameter outer sealing portion 7 are allowed to appropriately fit to each other (contact with each other), and contact between the tapered surface 25a of the cylindrical sealing portion 25 and the tapered surface 11c1 of the raised portion 11c in the inner-side diameter inner sealing portion 8 can be appropriately maintained. Therefore, by the tilt surface 21a being formed in the receiver opening 21, the sealing performance of the inner-side diameter outer sealing portion 7 and the inner-side diameter inner sealing portion 8 can be appropriately exhibited.

In the present example, the tilt surface 21a of the receiver opening 21 is maintained spaced from the outer circumferential surface of the tube 10. However, the tilt surface 21a may closely contact with the outer circumferential surface of the tube 10. In this case, the pipe joint 1 made of synthetic resin exhibits more excellent vibration-resistance as compared to a case where the tilt surface 21a is spaced from the outer circumferential surface of the tube 10.

Further, in the present example the axially outer end portion (the tilt surface 21a) of the receiver opening 21 is positioned so as to oppose the outer circumferential surface of the tube 10 that closely contacts with the tilt surface 11a1 of the protrusion 11a of the inner ring 11. However, the axially outer end portion may not be provided.

The union nut 3 is made of a synthetic resin material such as PVC, PP, PE, or fluororesin (PFA or PTFE), and formed so as to have a cylindrical shape, similarly to the joint body 2. The inner diameter of the union nut 3 is formed so as to be slightly greater than the outer diameter of the tube 10. When the joint body 2 is mounted to the leading end portion of the tube 10, the leading end portion of the tube 10 is inserted into the union nut 3.

Figure 2:
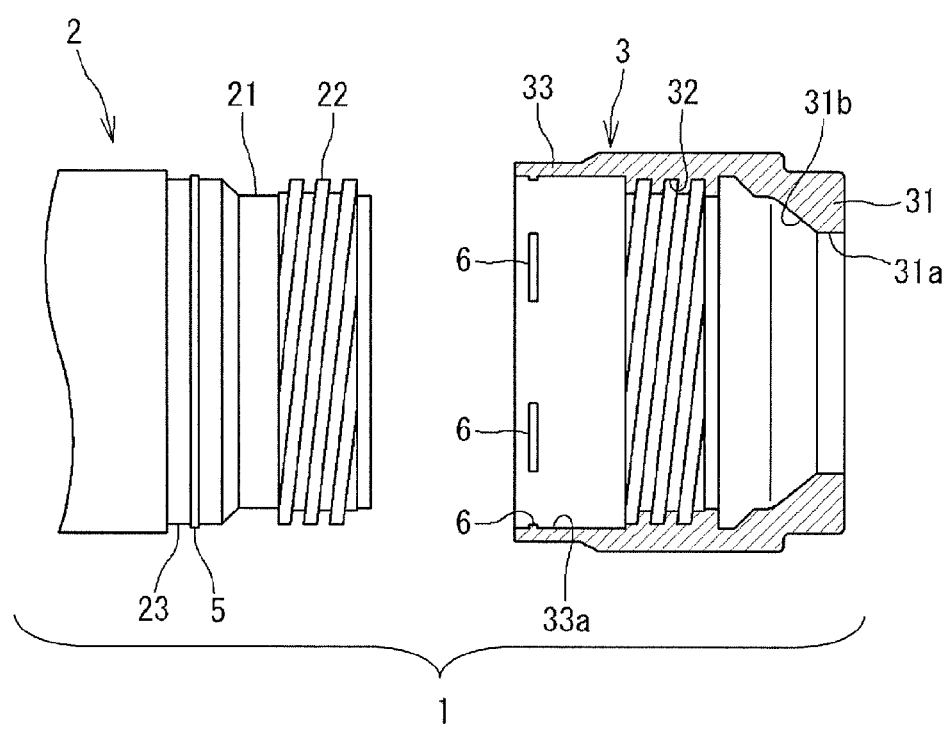
FIG. 2 is a side view illustrating a state where the pipe joint made of synthetic resin is disassembled.

FIG. 2 is a side view illustrating a state where the pipe joint made of synthetic resin is disassembled.

In FIG. 2, the union nut 3 includes a pressing portion 31, a female screw portion 32, and a protruding portion 33. The pressing portion 31 is formed on the axially outer end portion so as to project radially inward. The female screw portion 32 has a triple thread screw (multiple thread screw) formed in the inner circumferential portion of the axially center portion. The protruding portion 33 is formed in the axially inner end portion.

In the inner circumferential surface of the pressing portion 31, an insertion opening 31a through which the tube 10 is inserted is formed, and a pressing surface 31b is formed as a tapered surface having its diameter gradually enlarged in the axially inward direction from the end, on the axially inner side, of the insertion opening 31a.

The female screw portion 32 can be tightened onto the male screw portion 22 of the joint body 2. Therefore, in a state where the projection 11b of the inner ring 11 which is pressed into the tube 10 is inserted in the receiver opening 21 of the joint body 2, the union nut 3 is screwed in the axially inward direction of the joint body 2, whereby the tube 10 can be connected to the joint body 2.

At this time, the pressing portion 31 of the union nut 3 presses the outer circumferential surface of the tube 10 which covers the arc-shaped surface 11a2 of the inner ring 11. Therefore, the female screw portion 32 of the union nut 3 is tightened onto the male screw portion 22 of the joint body 2, and the union nut 3 is screwed in the axially inward direction, whereby the inner-side diameter outer sealing portion 7 and the inner-side diameter inner sealing portion 8 are formed, and the pressing surface 31b of the pressing portion 31 of the union nut 3 is brought into surface contact with the outer circumferential surface of the tube 10 which covers the arc-shaped surface 11a2 of the inner ring 11, so that an outer side sealing portion 9 for fluid sealing is formed.

Thus, the arc-shaped surface 11a2 of the inner ring 11 and the opposing inner circumferential surface of the tube 10 can more closely contact with each other. Further, since the pressing surface 31b of the union nut 3 is brought into surface contact with the outer circumferential surface of the tube 10, when the tube 10 and the inner ring 11 are pressed in the axially inward direction of the joint body 2 by the union nut 3 being screwed forward, force can be prevented from locally concentrating on the inner ring 11. Thus, the inner ring 11 may not tilt toward the radially inner portion of the tube 10. Therefore, prevention of movement of fluid and occurrence of liquid pooling due to the inner ring 11 being tilted, can be avoided, whereby liquid displacement characteristics become excellent.

Further, the outer circumferential surface of the tube 10 that covers the arc-shaped surface 11a2 of the inner ring 11 is pressure-contacted by the pressing surface 31b of the union nut 3, thereby preventing the tube 10 from being removed.

Further, since the pressing surface 31b is brought into surface contact with the outer circumferential surface of the tube 10 that covers the arc-shaped surface 11a2, concentration of stress generated in a portion of the tube 10 pressed by the union nut 3 can be reduced as compared to a structure where a corner portion (pressing edge 3C) of the union nut contacts with a tube as shown in FIG. 1 of Patent Literature 1 described above. Thus, occurrence of creep phenomenon can be delayed, and an excellent sealing performance can be maintained for a long time period. The pressing surface 31b is a tapered surface. However, the pressing surface 31b may be a concave arc-shaped surface that is brought into surface contact with the outer circumferential surface of the tube 10 that covers the arc-shaped surface 11a2.

A mounting structure for mounting the joint body 2 to the leading end portion of the tube 10 may be implemented as a structure, such as a flared structure or ferrule type structure, other than the inner ring type structure using the inner ring 11 as described above. That is, the present example can be used in common for a joint having a structure in which, in a state where a tube is inserted into a joint body having a male screw portion formed on the outer circumferential portion, a union nut having a female screw portion formed on the inner circumferential portion is screwed onto the male screw portion of the joint body, and the tube is pressed against the joint body and fixed due to the union nut being screwed forward, thereby forming a sealing portion. Further, the mounting structure is advantageously used widely as a locking member for a union nut of a pipe joint, made of synthetic resin, which serves as a joint by the union nut being screwed forward, for example, a joint that is fitted onto a tube, and allows a diameter of a ferrule to be reduced, to reduce a diameter of the tube and deform the tube due to the union nut being screwed forward, for avoiding removal of the tube.

Figure 3:
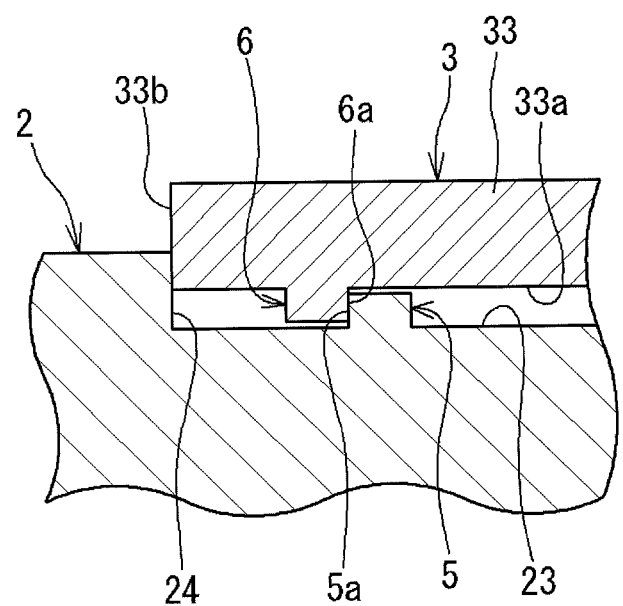
FIG. 3 is an enlarged cross-sectional view of a portion A in FIG. 1B.

FIG. 3 is an enlarged cross-sectional view of a portion A in FIG. 1B. As shown in FIG. 1B and FIG. 3, in a portion at which an outer circumferential surface 23 of the joint body 2 and an inner circumferential surface 33a of the protruding portion 33 of the union nut 3 oppose each other, the outer circumferential surface 23 of the joint body 2 has a projection portion 5 that projects in the radial direction, and the inner circumferential surface 33a of the union nut 3 has an engagement portion 6 that engages with the projection portion 5.

The projection portion 5 is formed axially inward of the male screw portion 22 integrally on the outer circumferential surface 23 of the joint body 2 such that the projection portion 5 is convex so as to project toward the inner circumferential surface 33a of the union nut 3 in the radially outward direction. Further, as shown in FIG. 2, the projection portion 5 is formed continuously over the entirety of the circumference of the outer circumferential surface 23 of the joint body 2.

In FIG. 3, the engagement portion 6 is formed integrally on the inner circumferential surface 33a of the union nut 3 such that the engagement portion 6 is convex so as to project toward the outer circumferential surface 23 of the joint body 2 in the radially inward direction. Further, as shown in FIG. 2, the engagement portion 6 is formed discontinuously in the circumferential direction of the inner circumferential surface 33a of the union nut 3 such that a plurality (six in the present example) of engagement portions are spaced from each other at predetermined intervals. Further, as shown in FIG. 3, the engagement portion 6 engages with the projection portion 5 of the joint body 2 when the union nut 3 is tightened up to an appropriate position in the case of the female screw portion 32 being tightened onto the male screw portion 22. Specifically, the engagement portion 6 is moved over the projection portion 5 from the axially outer side toward the axially inner side, whereby an end surface 6a, on the axially outer side, of the engagement portion 6 contacts and engages with an end surface 5a, on the axially inner side, of the projection portion 5.

A contact surface 24 is formed axially inward of the projection portion 5 integrally on the outer circumferential portion of the joint body 2 over the entirety of the circumference of the outer circumferential portion of the joint body 2 so as to extend radially outward from the outer circumferential surface 23. An end surface 33b, on the axially inner side, of the union nut 3 is brought into contact with the contact surface 24 simultaneously when the engagement portion 6 engages with the projection portion 5.

In the pipe joint 1 made of synthetic resin according to the present example that has the above structure, when the female screw portion 32 of the union nut 3 is tightened onto the male screw portion 22 of the joint body 2, tightening resistance is gradually increased as a degree of tightening approaches an appropriate value. When the union nut 3 is further tightened against the tightening resistance, the engagement portion 6 formed on the inner circumferential surface 33a of the union nut 3 is moved over the projection portion 5 formed on the outer circumferential surface 23 of the joint body 2 to engage with the projection portion 5. When the engagement portion 6 is moved over the projection portion 5, a torque required for tightening the union nut 3 is rapidly increased, and when the engagement portion 6 has been moved over the projection portion 5, a torque required for tightening the union nut 3 is rapidly reduced. Therefore, an operator is allowed to easily confirm that the engagement portion 6 has engaged with the projection portion 5 and a degree of tightening of the union nut 3 has reached an appropriate value. Thus, tightening of the union nut 3 can be appropriately controlled. Further, the projection portion 5 is integrated with the outer circumferential surface 23 of the joint body 2, and the engagement portion 6 is integrated with the inner circumferential surface 33a of the union nut 3. Therefore, even in a narrow place, construction for the pipe joint 1 made of synthetic resin can be facilitated. Further, tightening of the union nut 3 can be easily controlled in an appropriate manner without increasing the number of components. Moreover, the engagement portion 6 is moved over the projection portion 5 to engage with the projection portion 5, thereby preventing the union nut 3 from being loosened. Thus, the pipe joint 1 made of synthetic resin is allowed to stably exhibit a sealing performance.

Further, the male screw portion 22 of the joint body 2 and the female screw portion 32 of the union nut 3 have multiple thread screws (triple thread screws). Therefore, in a case where the female screw portion 32 is tightened onto the male screw portion 22, a distance (lead) over which the union nut advances in the axial direction when the female screw portion 32 is turned once, is increased. Thus, a time for tightening the union nut 3 can be shortened, whereby piping construction and maintenance work for the tube 10 made of synthetic resin can be accurately performed in a short time period.

Further, when the union nut 3 has been tightened up to an appropriate position, engagement of the engagement portion 6 with the projection portion 5, and contact of the end surface 33b of the union nut 3 with the contact surface 24 of the joint body 2 are simultaneously performed. Therefore, an operator is allowed to more easily confirm, according to the engagement and contact, that a degree of tightening of the union nut 3 has reached an appropriate value. Further, contact of the end surface 33b of the union nut 3 with the contact surface 24 of the joint body 2 can prevent the union nut 3 from being tightened further from the appropriate state. Therefore, when a degree of tightening of the union nut 3 has reached an appropriate value, the tightening can be assuredly finished.

Figure 4:
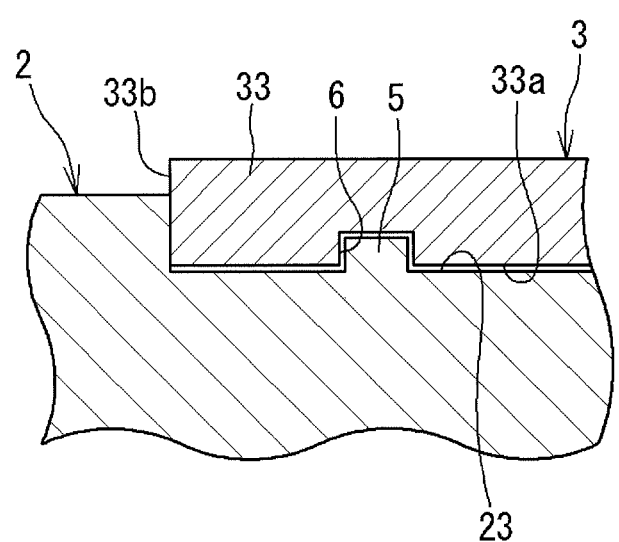
FIG. 4 is an enlarged cross-sectional view of a main portion of a pipe joint made of synthetic resin according to one or more embodiments of a second example of the present invention.

FIG. 4 is an enlarged cross-sectional view of a main portion of a pipe joint made of synthetic resin according to one or more embodiments of a second example the present invention. The pipe joint 1 made of synthetic resin according embodiments of a first example differ from embodiments of the second examples in that a structure of the engagement portion 6. Specifically, the engagement portion 6 of the present example is formed integrally in the inner circumferential surface 33a of the union nut 3 such that the engagement portion 6 is concave so as to be recessed radially outward. Further, the engagement portion 6 is formed continuously over the entirety of the circumference of the inner circumferential surface 33a of the union nut 3. Thus, when the female screw portion 32 is tightened onto the male screw portion 22, and a degree of tightening reaches an appropriate value, the engagement portion 6 of the union nut 3 fits to and engages with the projection portion 5 of the joint body 2 as shown in FIG. 4. The other components of the present example are the same as described above, and the description thereof is not given.

As described above, also in the pipe joint 1 made of synthetic resin according to the present example, when the union nut 3 is tightened up to an appropriate position, the engagement portion 6 formed in the inner circumferential surface 33a of the union nut 3 is moved over the projection portion 5 formed in the outer circumferential surface 23 of the joint body 2 to engage with the projection portion 5. Thus, an operator is allowed to easily confirm that a degree of tightening of the union nut 3 has reached an appropriate value, and to appropriately control tightening of the union nut 3.

The present invention is not limited to the above embodiments. For example, in one or more embodiments of the first example, the projection portion 5 is formed continuously in the circumferential direction, and the engagement portion 6 is formed discontinuously in the circumferential direction. However, the engagement portion 6 may be continuously formed. Further, the projection portion 5 may be discontinuously formed and the engagement portion 6 may be continuously formed.

Further, in one or more embodiments of the first example, a projection portion of the joint body 2 is the projection portion 5 and a projection portion of the union nut 3 is the engagement portion 6. However, the projection portion of the joint body 2 may be the engagement portion 6 and the projection portion of the union nut 3 may be the projection portion 5.

Moreover, in one or more embodiments of the second example, the projection portion 5 having a convex shape is formed in the joint body 2 and the engagement portion 6 having a concave shape is formed in the union nut 3. However, the projection portion 5 having a convex shape may be formed in the union nut 3, and the engagement portion 6 having a concave shape may be formed in the joint body 2.

Further, in one or more embodiments of the second example, both the projection portion 5 and the engagement portion 6 are formed continuously in the circumferential direction. However, the projection portion 5 may be discontinuously formed and the engagement portion 6 may be continuously formed.

Further, in one or more embodiments of the first example and second example, the male screw portion 22 of the joint body 2 and the female screw portion 32 of the union nut 3 are formed as triple thread screws. However, the male screw portion 22 and the female screw portion 32 may be formed as single thread screws. However, from the viewpoint that the control for the tightening is efficiently performed, multiple thread screws having two or more threads are advantageous.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 pipe joint made of synthetic resin
2 joint body
3 union nut 5 projection portion
6 engagement portion
10 tube
22 male screw portion
23 outer circumferential surface
24 contact surface
32 female screw portion
33a inner circumferential surface

The invention claimed is:

1. A pipe joint made of synthetic resin, comprising:
a joint body made of synthetic resin, wherein
the joint body comprises a male screw portion on an outer circumferential portion and is mounted to a leading end portion of a tube made of synthetic resin; and
a union nut made of synthetic resin, wherein
the union nut comprises a female screw portion formed on an inner circumferential portion and that tightens onto the male screw portion of the joint body,
wherein one surface of an outer circumferential surface of the joint body and an inner circumferential surface of the union nut has a projection portion integrated with the one surface such that the projection portion projects in a radial direction,
the other surface of the outer circumferential surface of the joint body and the inner circumferential surface of the union nut has a convex or concave engagement portion integrated with the other surface such that the engagement portion engages with the projection portion when the union nut is tightened up to an appropriate position,
wherein a contact surface is formed on the outer circumferential portion of the joint body, and
wherein, in a state in which the joint body and union nut are fully engaged, the contact surface simultaneously contacts an end surface of the union nut when a surface of the projection portion that faces the contact surface engages with a surface of the engagement portion that faces the surface of the projection portion.

2. The pipe joint made of synthetic resin according to claim 1, wherein the male screw portion and the female screw portion have multiple thread screws.

3. The pipe joint made of synthetic resin according to claim 1, wherein the engagement portion is moved over the projection portion to engage with the projection portion.

* * * * *